(12) United States Patent
Eberhard et al.

(10) Patent No.: US 8,945,747 B2
(45) Date of Patent: Feb. 3, 2015

(54) BATTERY CELL HAVING AN ATTACHMENT STRUCTURE AND VEHICLE BATTERY MODULE

(75) Inventors: Martin Eberhard, Woodside, CA (US); Rob Sweney, San Francisco, CA (US)

(73) Assignees: Volkswagen AG, Wolfsburg (DE); Audi AG, Ingolstadt (DE)

( * ) Notice: Subject to any disclaimer, the term of this patent is extended or adjusted under 35 U.S.C. 154(b) by 837 days.

(21) Appl. No.: 13/009,621

(22) Filed: Jan. 19, 2011

(65) Prior Publication Data

US 2012/0141853 A1   Jun. 7, 2012

Related U.S. Application Data

(60) Provisional application No. 61/420,547, filed on Dec. 7, 2010.

(51) Int. Cl.
*H01M 2/10* (2006.01)

(52) U.S. Cl.
CPC .................................. *H01M 2/1077* (2013.01)

USPC ................ 429/99; 429/97; 429/163; 429/178

(58) Field of Classification Search
None
See application file for complete search history.

(56) References Cited

U.S. PATENT DOCUMENTS

| | | | | |
|---|---|---|---|---|
| 2,879,316 | A * | 3/1959 | Enikeieff ........................ | 429/99 |
| 2004/0043287 | A1* | 3/2004 | Bando et al. .................. | 429/156 |
| 2007/0188147 | A1* | 8/2007 | Straubel et al. ................ | 320/134 |
| 2009/0208829 | A1 | 8/2009 | Howard et al. | |
| 2011/0064987 | A1* | 3/2011 | Ogasawara et al. ........... | 429/121 |

* cited by examiner

*Primary Examiner* — Ula C. Ruddock
*Assistant Examiner* — Tony Chuo
(74) *Attorney, Agent, or Firm* — Kenyon & Kenyon LLP (57) ABSTRACT

In a longitudinal battery cell for a vehicle battery module, the battery cell includes a first end and an opposite second end with respect to a longitudinal axis of the battery cell, and a lateral surface extending from the first end to the second end. The battery cell includes an attachment structure extending in an outward direction from the lateral surface at the second end for coupling the battery cell to the battery module.

7 Claims, 6 Drawing Sheets

BATTERY CELL HAVING AN ATTACHMENT STRUCTURE AND VEHICLE BATTERY MODULE

CROSS-REFERENCE TO RELATED APPLICATIONS

The present application claims the benefit of U.S. Provisional Patent Application Ser. No. 61/420,547, filed on Dec. 7, 2010, which is expressly incorporated herein in its entirety by reference thereto.

FIELD OF THE INVENTION

The present invention relates to a battery cell and to a vehicle battery module. More particularly, the present invention relates to a longitudinal battery cell for a vehicle battery module and a vehicle battery module for accommodating a plurality of longitudinal battery cells, and the present invention relates to a longitudinal battery cell including an attachment structure for coupling the battery cell to the battery module.

SUMMARY

According to example embodiments, a longitudinal battery cell for a vehicle battery module is provided. The battery cell has a first end and an opposite second end with respect to a longitudinal axis of the battery cell. The battery cell has furthermore a lateral surface extending from the first end to the second end. The battery cell includes an attachment structure extending in an outward direction from the lateral surface at the second end of the battery cell. The attachment structure serves for coupling the battery cell to the battery module.

According to example embodiments, a vehicle battery module for accommodating a plurality of longitudinal battery cells is provided. The battery cells are arranged in the battery module in parallel with respect to their longitudinal axes. Each battery cell has a first end and an opposite second end with respect to its longitudinal axis and a lateral surface extending from the first end to the second end. Each battery cell includes an attachment structure extending in an outward direction from the lateral surface at the second end. The battery module includes an alignment plate including a plurality of openings. Each opening is adapted to receive a corresponding battery cell of the plurality of battery cells and to couple to the attachment structure of the corresponding battery cell.

Although certain features described in the above summary and the following description are described in connection with particular example embodiments, it is to be understood that the features described herein can be combined with each other unless noted otherwise.

Exemplary embodiments of the present invention are described in more detail below with reference to the appended Figures.

DETAILED DESCRIPTION

In the following, exemplary embodiments of the present invention will be described in more detail. It is to be understood that the following description is given only for the purpose of illustrating the principles hereof and is not to be taken in a limiting sense.

It is to be understood that in the following description of the example embodiments, any direct connection of coupling between devices, components or other physical units shown in the drawings or described herein could also be implemented in an indirect connection or coupling. The same reference characters in the various instances of the drawings refer to similar or identical components. Furthermore, it is to be understood that the features of the various example embodiments described herein maybe combined with each other unless specifically noted otherwise.

Typically, electric vehicles or hybrid vehicles include at least one electrical engine for driving the vehicle and a rechargeable driving battery for storing and providing electrical energy for the electrical engine. The driving battery may include several hundreds or several thousands of battery cells. The battery cells may be arranged in battery modules including each a plurality of battery cells, e.g., up to 50 or 100 battery cells. In each battery module, battery cells may be connected in parallel, and the battery modules may be electrically combined in a parallel and/or serial connection to provide as a whole the required electrical voltage, current and capacity.

In a battery module a plurality of longitudinal battery cells, e.g., 18650 form factor battery cells, may be arranged standing upright in parallel. These longitudinal battery cells typically provide a first electrical terminal at the upper side and a second electrical terminal at the lower side. For setting up an electrical parallel connection of the battery cells an upper conductor plate for connecting the upper electrical terminals and a lower conductor plate for connecting the lower electrical terminals may be provided. However, especially for an electric vehicle and a corresponding vehicle environment with vibrations and temperature fluctuations, all battery cells have to be securely fixed and electrically and thermally contacted taking into account mechanical tolerances of the dimensions of the battery cells and dimensions of the conductor plates.

According to an example embodiment of the present invention, a longitudinal battery cell for a vehicle battery module is provided. The battery cell has a first end and an opposite second end with respect to a longitudinal axis of the battery cell. From the first end to the second end extends a lateral surface of the battery cell. At the second end, the battery cell includes an attachment structure for coupling the battery cell to the battery module. The attachment or fixation structure extends in an outward direction from the lateral surface at the second end. By coupling the battery cell at the second end via the attachment structure to the battery module, the second end of the battery cell can be affixed to the battery module such that the battery cell is held tightly in all dimension, especially in the direction of the longitudinal axis of the battery cell. Thus, the battery cell can be securely held in place without affixing the first end of the battery cell. However, the first end of the battery cell may be additionally supported in directions perpendicular to the longitudinal axis of the battery cell to improve fixation of the battery cell. However, support in the longitudinal axis of the battery cell is not needed at the first end. This allows to compensate length tolerancing of the battery cell in the longitudinal direction.

The battery cell may have a cylindrical shape having a first electrical terminal of a first polarity at the first end and a second electrical terminal of the second polarity at the second end. The cylindrical shape allows to arrange a plurality of battery cells within one vehicle battery module in a dense arrangement by arranging the battery cells in parallel with respect to their longitudinal axes. The electrical terminals at the first and second ends of the battery cells allow to connect the battery cells electrically in parallel by arranging a first or upper conductor plate above the battery cells along the first ends of the battery cells and a second or lower connector plate below the battery cells along the second ends of the battery cells. In an exemplary embodiment, the first polarity may include a positive polarity of the battery cell and the second polarity may include a negative polarity of the battery cell. In the present context, the terms "upper end" and "first end" are used synonymously and the terms "lower end" and "second end" are also used synonymously. However, the directional terms "upper" and "lower" relate only to the exemplary embodiments and do not restrict an orientation of the battery cells or the battery modules as they are built in a vehicle.

According to example embodiments, the attachment structure includes a circumferential lip or rim extending in an outward direction from the lateral surface at a connecting edge between the lateral surface and the second end. Such a protruding lip or rim may be easily added to the battery cell by welding the attachment structure to the lateral surface or may be formed during a production of the battery cell by pressing the lateral surface or forming the second end correspondingly.

According to example embodiments, the attachment structure includes at least one tab extending in the outward direction from the lateral surface at a connecting edge between the lateral surface and the second end. For example, three tabs may be provided at each battery cell equally spaced along the connecting edge. The tabs may be welded to the lateral surface or may be formed integrally with the lateral surface or the second end of the battery cell.

According to example embodiments, a vehicle battery module for accommodating a plurality of longitudinal battery cells is provided. In the battery module the battery cells are arranged in parallel with respect to their longitudinal axes. Each battery cell has a first end and an opposite second end with respect to its longitudinal axis and a lateral surface extending from the first end to the second end. Each battery cell includes an attachment structure extending in an outward direction from the lateral surface at the second end. The battery module includes an alignment plate for receiving the battery cells. The alignment plate includes a plurality of openings. Each opening is adapted to receive a corresponding battery cell and couple or engage to the attachment structure of the corresponding battery cell. Thus, the second ends of the battery cells are held securely in place independently of a length tolerance of the battery cells in the longitudinal directions of the battery cells.

According to certain example embodiments, each opening of the alignment plate includes a coupling structure adapted to couple to the attachment structure of the corresponding battery cell. The coupling structure may be, e.g., a twist lock, a groove, a snap fit or a screw thread.

According to example embodiments, the vehicle battery module includes furthermore a conductor plate adapted to electrically couple the second ends of the battery cells. The conductor plate is arranged in parallel to the alignment plate and coupled to the alignment plate. Each opening of the alignment plate is dimensioned such that a corresponding battery cell can protrude through the opening in the longitudinal direction of the battery cell when the corresponding battery cell is mounted in the battery module. Furthermore, the alignment plate is dimensioned such that in the mounted state of the battery cell the attachment structure of the corresponding battery cell is held between the alignment plate and the conductor plate. For receiving the attachment structure, each opening of the alignment plate may include a corresponding indentation, e.g., the above-mentioned groove or snap fit structure.

In more detail, a rim of each opening of the alignment plate may include an indentation on a face of the alignment plate facing the conductor plate. The indentation forms in combination with the conductor plate a recess or groove for receiving the attachment structure of the corresponding battery cell. Thus, the vehicle battery module can be easily assembled by inserting the battery cells into the openings of the alignment plate and subsequently fixing the connector plate to the alignment plate. As an alternative, the battery cells can be arranged on the conductor plate and the alignment plate can be attached to the conductor plate by inserting the arranged battery cells through the openings of the alignment plate.

According to example embodiments, the vehicle battery module furthermore includes a thermal conductive material layer sandwiched between the conductor plate and the alignment plate. As described above, the second end of the battery cells may provide the negative electrical terminals of the battery cells. In commonly used battery cells, heat of the battery cells generated in operation or during charging the battery cells flows best through the negative end of the cell surface which is the second end of the battery cell. Therefore, the thermal conductive material layer between the conductor plate and the alignment plate may contribute to a thermal connection between the connector plate and the second ends of the battery cells thus providing a thermal pathway from the battery cells to the conductor plate. The conductor plate may be coupled to a cooling plate or may provide a cooling function.

According to example embodiments, the conductor plate includes a plurality of openings. Each opening is aligned to the second end of a corresponding battery cell. At a rim of each of the openings of the conductor plate and indentation may be provided. A wire bond for electrically connecting a corresponding battery cell to the conductor plate may be coupled at one end to the indentation of the conductor plate and at the other end to the second end of the corresponding battery cell. The wire bond provides reliable electrical connection between the battery cell and the conductor plate. The indentation protects the wire bond from mechanical influences at the lower side of the conductor plate.

According to example embodiments, the vehicle battery module includes a frame element including a plurality of holding structures for holding the first ends of the battery cells. Each holding structure is configured to receive the first end of a corresponding battery cell and to support the corresponding battery cell in a direction perpendicular to the longitudinal direction of the battery cell. Thus, the first end of the battery cell is reliably held in the direction perpendicular to the longitudinal direction of the battery cell and the second end of the battery cell is held reliably in the direction perpendicular to the longitudinal direction of the battery cell and additionally in the longitudinal direction of the battery cell. Therefore, the battery cell is held reliably at both ends even if the battery cell exhibits tolerances in the longitudinal direction.

The above-described exemplary embodiments will now be described in more detail with reference to accompanying drawing.

Figure 1:
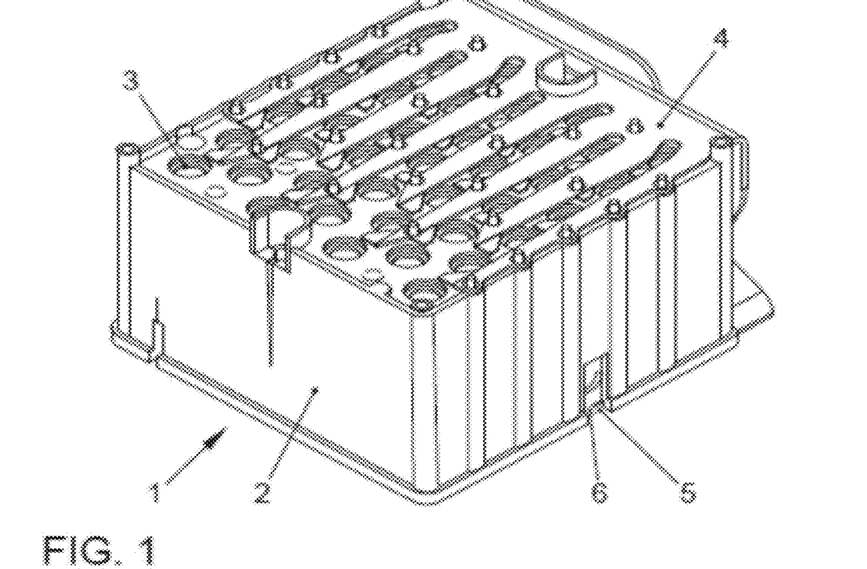
FIG. 1 schematically illustrates a perspective view of a vehicle battery module according to an example embodiment of the present invention.

FIG. 1 schematically illustrates a perspective view of an example embodiment of a vehicle battery module 1. The vehicle battery module 1 includes a frame 2, a plurality of battery cells 3, an upper conductor plate 4, a lower conductor plate 5, and an alignment plate 6. The battery cells 3 are arranged in parallel with respect to their longitudinal axes in the battery module 1. Each battery cell 3 includes a first end, which is shown in FIG. 1 at the upper side, and a second end which is not visible in FIG. 1 and which is arranged at the lower side of the battery module 1. The first ends of the battery cells may include positive electrical terminals of the battery cells 3, and the second ends may include negative electrical terminals of the battery cells 3. The battery module 1 shown in FIG. 1 includes 39 battery cells 3. However, in other example embodiments, the battery module 1 may include any other number of battery cells 3.

At the upper side of the battery frame 2, the upper conductor plate 4 is arranged. The upper conductor plate 4 includes a base part and eight longitudinal members extending from the base part like fingers. Along a longitudinal edge of the longitudinal members a plurality of tabs are arranged. Each battery cell 3 is assigned one of the tabs and each battery cell 3 may be electrically connected to the assigned tab via a wire bond. The wire bond may extend from the tab nearest to the upper end of a corresponding battery cell 3 through a hole in the frame 2 to the upper end of the corresponding battery cell 3. The lower ends of the battery cells 3 are electrically coupled to the lower conductor plate 5.

Figure 2:
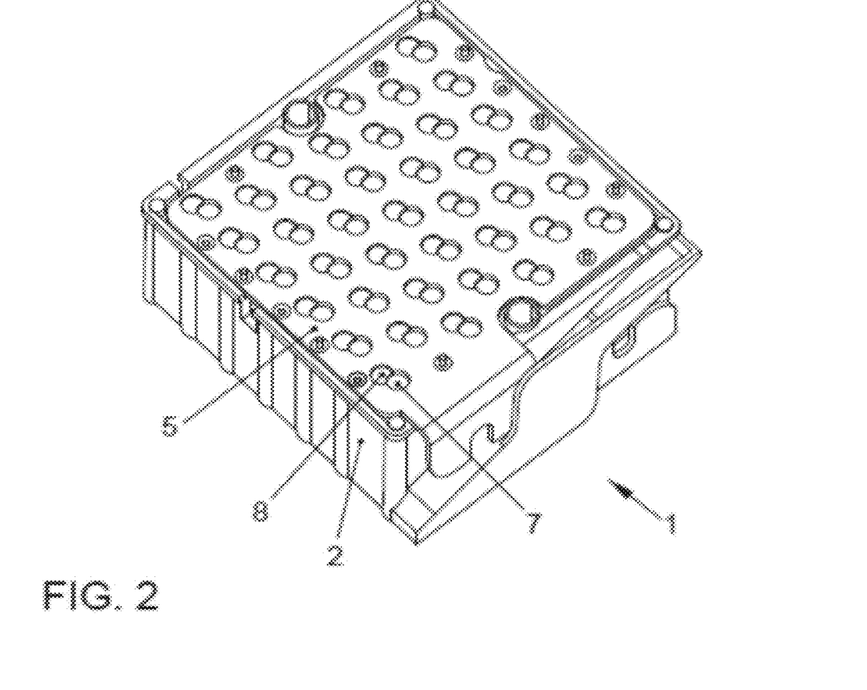
FIG. 2 shows a perspective bottom-side view of the vehicle battery module of FIG. 1.

FIG. 2 shows the lower conductor plate 5 in more detail. The lower conductor plate includes a plurality of openings 7, wherein each opening 7 is assigned to a corresponding battery cell 3. The openings 7 are arranged such that the lower end of the corresponding battery cell 3 is accessible through the opening 7. Each opening 7 is assigned an indentation 8 in the lower conductor plate 5. A wire bond for contacting the lower end of the battery cells 3 to the lower conductor plate 5 may be coupled at one end to the indentation 8 and at the other end to the lower end of the corresponding battery cell 3.

Figure 3:
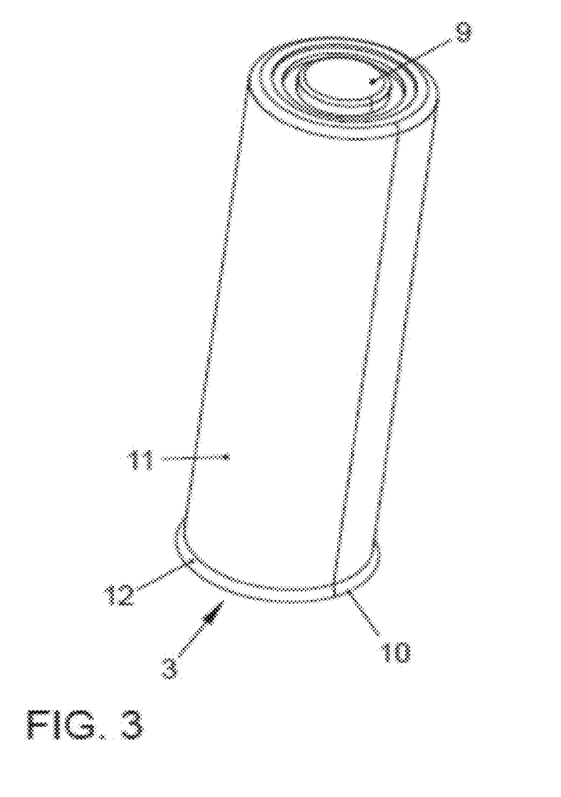
FIG. 3 schematically illustrates a perspective view of a battery cell according to an example embodiment of the present invention.
Figure 4:
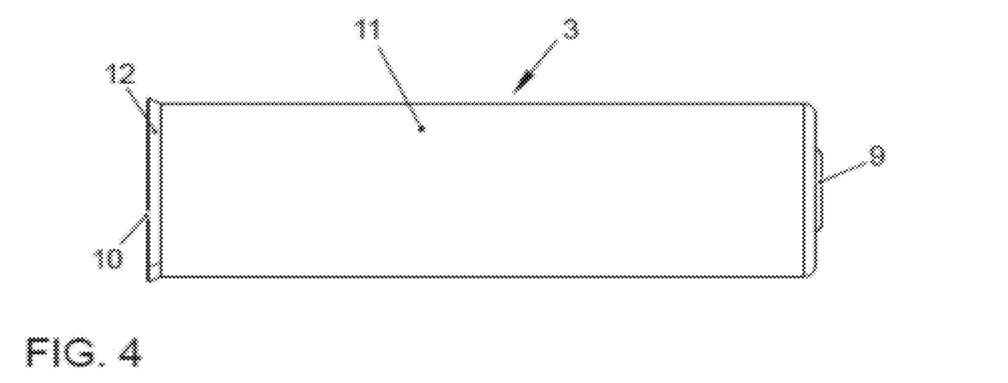
FIG. 4 shows a lateral view of the battery cell of FIG. 3.

The structure of the battery cells 3 will now be described in more detail in connection with FIGS. 3 and 4. FIG. 3 shows a perspective view of the battery cell 3. The battery 3 has a cylindrical shape with a first or upper end 9 and second or lower end 10. A circumferential lateral surface 11 extends between the first end 9 and the second end 10. At the second end 10 a circumferential lip 12 is provided at an connecting edge between the circumferential lateral surface 11 and the second end 10. The lip 12 extends in an outward direction from the circumferential lateral surface 11. The lip 12 may be integrally formed with the lateral surface 11, e.g., by pressing the material of the lateral surface 11 during a production process of the battery cell 3, or may be integrally formed with the lower end 10. Furthermore, the lip 12 may be a separate element attached to the lateral surface 11, e.g., by welding, soldering or press-fitting. The battery cell 3 has a first electrical contact, e.g., a positive electrical contact, at the first end 9 and a second electrical contact, e.g., a negative electrical contact, at the second end 10. As shown in FIG. 4, the lip 12 may have a tapered shape such that a circumference of the lip 12 reduces from the second end 10 in the direction to the first end 9. The lip 12 allows to tightly hold the second end 10 of the battery cell 3 in a corresponding holding structure in all spatial directions. At the first end 9, the battery cell 3 might additionally be fixed or held in a direction perpendicular to the circumferential lateral surface 11, but not in a longitudinal direction extending from the first end 9 to the second end 10. This allows the battery cell 3 to be reliably fixed even if the battery cell 3 exhibits tolerances in the longitudinal direction.

Figure 5:
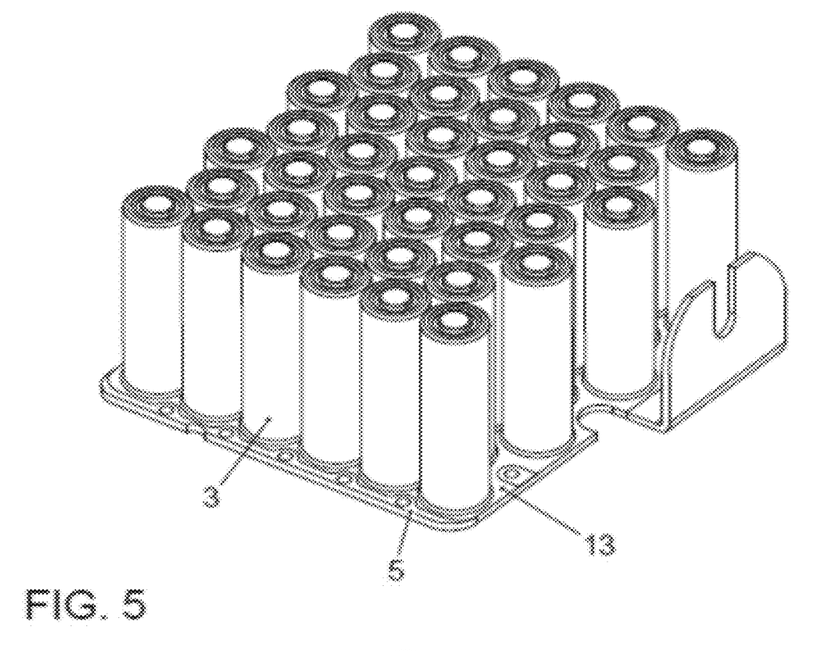
FIG. 5 shows a perspective view of a plurality of battery cells arranged on a conductor plate according to an example embodiment of the present invention.
Figure 6:
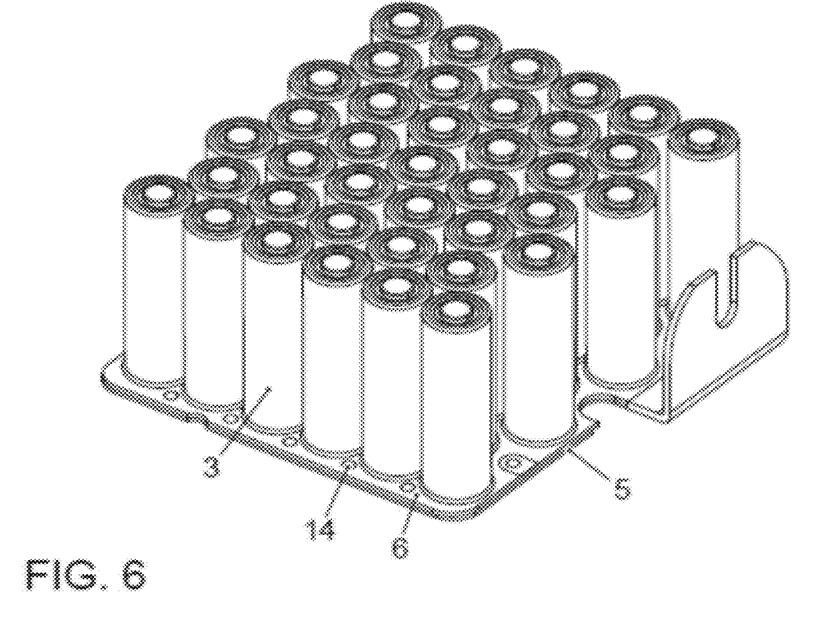
FIG. 6 shows the plurality of battery cells arranged on the conductor plate shown in FIG. 5 and fixed to the conductor plate by an alignment plate.
Figure 7:
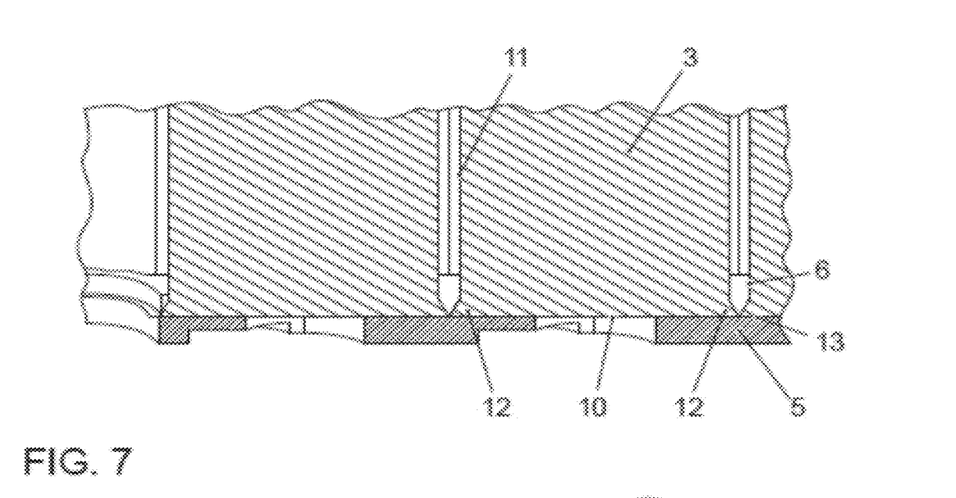
FIG. 7 shows an enlarged sectional view of FIG. 6.

FIGS. 5 to 7 show a mounting of battery cells 3 on the conductor plate 5. As shown in FIG. 5, the battery cells 3 are arranged in an upright standing position on the conductor plate 5 with the first ends 9 at the upper side and the second ends 10 at the lower side facing the conductor plate 5. Between the lower ends 10 of the battery cells 3 and the conductor plate 5 a thermal conductive material layer 13 may be arranged to improve a thermal contact between the first ends 10 and the conductor plate 5. For fixing the battery cells 3 to the conductor plate 5, an alignment plate 6 is guided from above and in parallel to the conductor plate 5 (see FIG. 8). The alignment plate 6 includes a plurality of holes, in which each hole is adapted such that a corresponding battery cell 3 can be passed through the hole in its longitudinal direction. Furthermore, each hole in the alignment plate 6 is dimensioned such that the lip 12 can not pass through the hole but is retained by the alignment plate 6 as shown in FIG. 6. FIG. 7 shows a sectional view of the second end 10 of a battery cell 3 being retained by an engagement of the lip 12 and the alignment plate 6. In the sectional view of FIG. 7, the lip 12 extends horizontally in the left and right directions from the lateral surface 11 of the battery cell 3. As can be seen, the main body of the battery cell 3 extends through the corresponding hole in the alignment plate 6 and the lip 12 is retained by the tapered structure at the rim of the hole in the alignment plate 6. When the alignment plate 6 is fixedly attached to the conductor plate 5, e.g. by fixing device 14, such as rivets or heat stakes, the second end 10 of the battery cell 3 is reliably held by the engagement of the lip 12 in the corresponding groove formed by the alignment plate 6 and the conductor plate 5. Thus, the battery cells 3 are reliably held in the longitudinal direction of the battery cells 3 as well as in the directions parallel to the plane of the conductor plate. Thus, the second ends 10 of the battery cells 3 are tightly fixed to the conductor plate 5 in all spatial directions.

Figure 8:
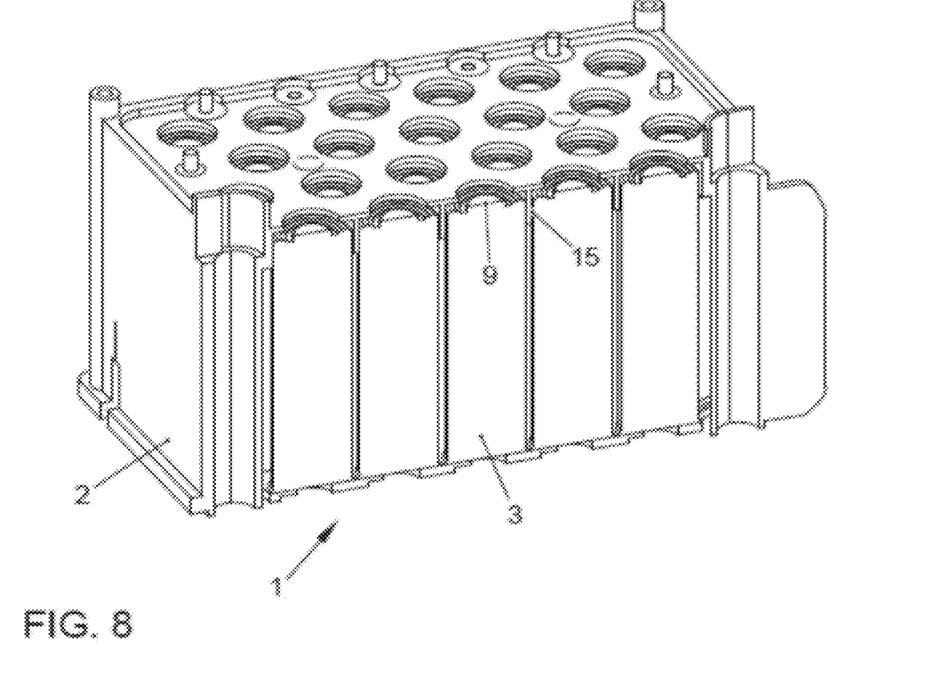
FIG. 8 shows a sectional view of the battery module of FIG. 1.
Figure 9:
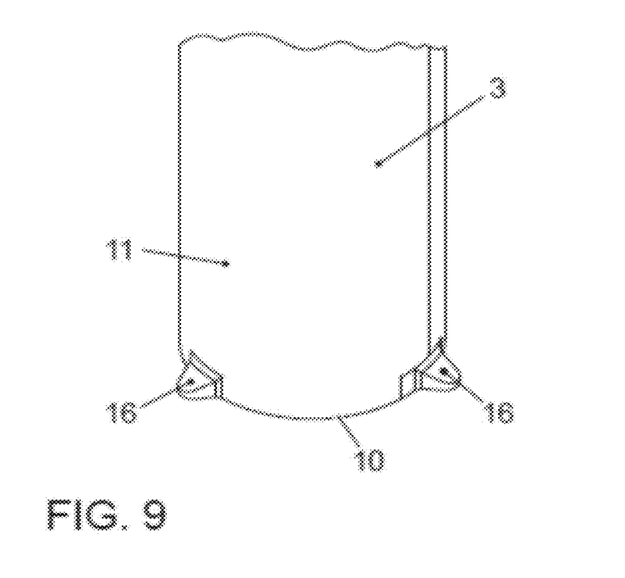
FIG. 9 shows a perspective partial view of a battery cell according to an example embodiment of the present invention.

FIG. 8 shows a sectional view of the battery module 1 of FIG. 1. In order to improve a fixation of the first upper ends 9 of the battery cells 3, the frame 2 provides a plurality of holding structures 15 holding the first end 9 of each battery cell 3 along the circumferential lateral surface 11 at the first end 9. Thus, the holding structure 15 supports the battery cell 3 in the lateral direction but does not support the first end 9 of the battery cell in the longitudinal direction. Therefore, the fixation of the first end 9 of the battery cell 3 in the frame 2 allows tolerances in the longitudinal direction of the battery cell 3.

In connection with FIGS. 9 to 12, an example embodiment of the present invention will be described in more detail. Instead of the lip 12 shown in FIG. 3, according to this example embodiment, a plurality of protrusions or tabs 16 are arranged at the lower end 12 of the battery cell 3. The tabs 16 extend in the outward direction from the lateral surface 11 at a connecting edge between the lateral surface 11 and the second end 10. The tabs 16 may be separate elements which are attached by welding or soldering to the lateral surface 11. Alternatively, the tabs 16 may be integrally formed with the lateral surface 11 or a base plate of the second end 10. In the example embodiment shown in FIG. 9, three tabs 11 are arranged equally spaced along the connecting edge between the lateral surface 11 and the second end 10. However, any other number of tabs 16 and any other configuration of the tabs may also be used.

Figure 10:
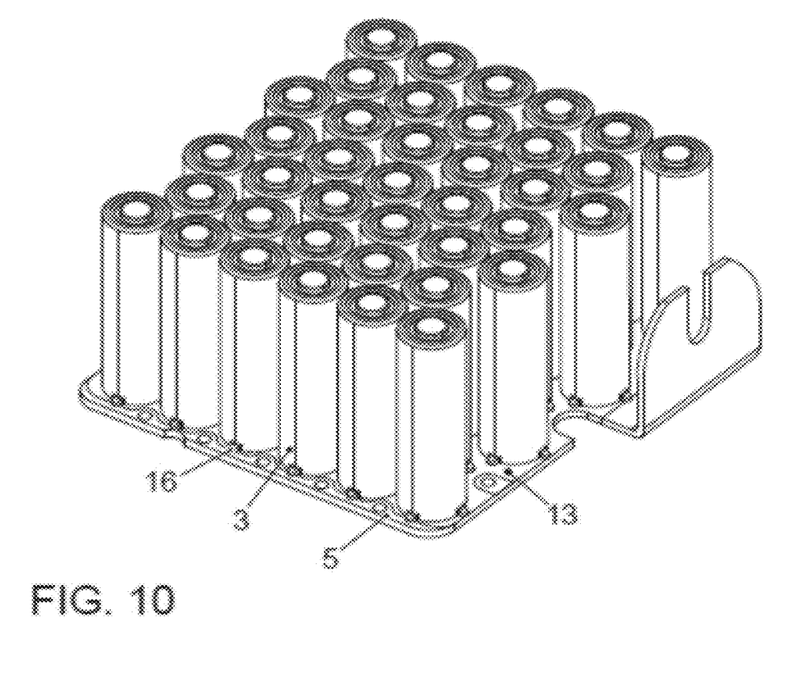
FIG. 10 shows a plurality of battery cells shown in FIG. 9 arranged on a conductor plate.
Figure 11:
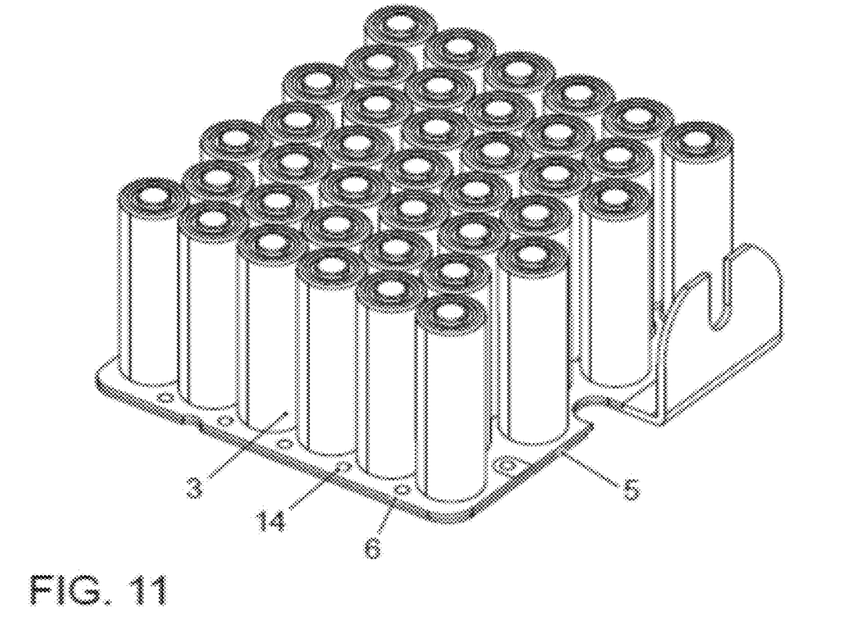
FIG. 11 shows the plurality of battery cells arranged on the conductor plate as shown in FIG. 10 affixed by an alignment plate.
Figure 12:
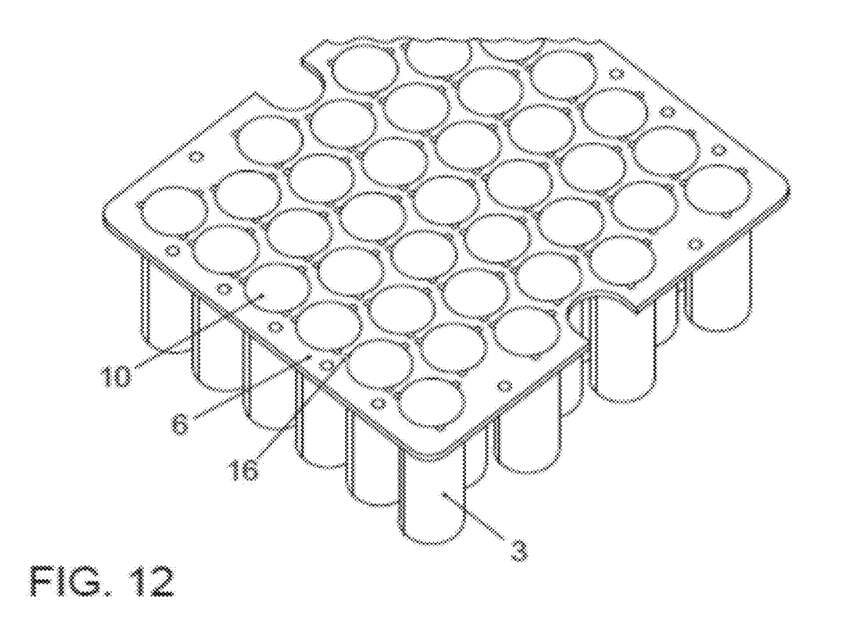
FIG. 12 shows a bottom view of the alignment plate of FIG. 11 holding a plurality of battery cells.

The functioning of the tabs 16 in combination with a corresponding alignment plate 6 and the conductor plate 5 is comparable to the functioning of the lip 12 described above. As can be seen from FIGS. 10 to 12, the battery cells 3 are mounted standing upright with their second ends 10 at the lower side on the conductor plate 5 (FIG. 10). The alignment plate 6 is configured such that the main body of the battery cell 3 can be passed through a corresponding opening in the alignment plate 6 and the tabs 16 are retained from passing through the corresponding hole (see FIG. 12). Thus, in an assembled state as shown in FIG. 11, the tabs 16 are engaged between the alignment plate 6 and the conductor plate 5. Thus, the second end of the battery cell 3 is reliable in all spatial directions.

While exemplary embodiments have been described above, various modifications may be implemented. For example, the lip 12 or the tab 16 at the second end 10 may be replaced by any other appropriate kind of attachment structure for coupling the second end 10 of the cell 3 to the alignment plate 6. For example, a screw thread may be provided at the second end 10 and a matching thread may be provided at the alignment plate 6. Furthermore, the alignment and the conductor plate 5 may be integrally formed as one component for receiving the attachment structure.

What is claimed is:

1. A vehicle battery module comprising: a plurality of longitudinal battery cells, the battery cells arranged in the battery module in parallel with respect to their longitudinal axes, each battery cell having a first end and an opposite second end with respect to the longitudinal axis and a lateral surface extending from the first end to the second end, and each battery cell including an attachment structure extending in an outward direction from the lateral surface at the second end; an alignment plate including a plurality of openings, each opening being adapted to receive and couple to the attachment structure of a corresponding battery cell of the plurality of battery cells; and a conductor plate adapted to electrically couple to the second ends of the battery cells, the conductor plate being arranged in parallel to the alignment plate and coupled to the alignment plate, wherein each opening of the alignment plate is dimensioned such that when the corresponding battery cell is mounted in the battery module, the corresponding battery cell protrudes through the opening in the longitudinal direction and the attachment structure of the corresponding battery cell is held between the alignment plate and the conductor plate, wherein the attachment structure is in direct contact with the conductor plate.

2. The vehicle battery module according to claim 1, wherein the opening includes a coupling structure adapted to couple to the attachment structure, the coupling structure including at least one of (a) a twist-lock, (b) a groove, (c) a snap fit, and (d) a screw thread.

3. The vehicle battery module according to claim 1, wherein a rim of each opening of the alignment plate includes an indentation on a face of the alignment plate facing the conductor plate, wherein the indentation forms in combination with the conductor plate a recess for receiving the attachment structure of the corresponding battery cell.

4. The vehicle battery module according to claim 1, further comprising a thermal conductive material layer sandwiched between the conductor plate and the alignment plate.

5. The vehicle battery module according to claim 1, wherein the conductor plate includes a plurality of openings, each opening being aligned with the second end of a corresponding battery cell.

6. The vehicle battery module according to claim 5, wherein at a rim of each of the openings of the conductor plate an indentation is provided, wherein a wire bond for electrically connecting the corresponding battery cell to the conductor plate is coupled to the indentation and the second end of the corresponding battery cell.

7. The vehicle battery module according to claim 1, further comprising a frame element including a plurality of holding structures, each holding structure being configured to receive the first end of a corresponding battery cell and to support the corresponding battery cell in a direction perpendicular to the longitudinal direction of the battery cell.

* * * * *